United States Patent [19]
Loose et al.

[11] 3,920,513
[45] Nov. 18, 1975

[54] PROTECTION SYSTEM FOR A NUCLEAR REACTOR

[75] Inventors: Robert A. Loose, Murrysville; William W. Brown, Monroeville, both of Pa.

[73] Assignee: Westinghouse Electric Corporation, Pittsburgh, Pa.

[22] Filed: Apr. 18, 1973

[21] Appl. No.: 352,371

[52] U.S. Cl. .................................................. 176/20
[51] Int. Cl. ........ G21c 7/36; G21c 7/32; G21c 7/22
[58] Field of Search ...................................... 176/20

[56] References Cited
UNITED STATES PATENTS
3,247,074   4/1966   Schluderberg et al. ............ 176/20 R Primary Examiner—Benjamin A. Borchelt
Assistant Examiner—Thomas H. Webb
Attorney, Agent, or Firm—J.R. Campbell

[57] ABSTRACT

A protection system for a nuclear reactor which prevents reactor power excursions when conditions arise causing rapid cooldown of the reactor coolant, as when a steam break occurs in the supply line to a steam generator-turbine steam circuit, or under other conditions requiring rapid insertion of boric acid into the reactor. A pump having its inlet connected to the reactor primary coolant loop discharges into, or takes suction from, a tank containing a 12% boric acid or other neutron absorbing solution, and forces the solution into the remaining legs of the reactor primary cooling loop. Valves on both sides of the tank keep the tank isolated from the reactor when not in use.

As abnormal conditions arise causing loss of coolant temperature, temperature or pressure responsive elements in the main or secondary coolant loops sense the change and provide a signal which causes the tank valves to open and the pumps then force boric acid from the tank directly into the reactor core or into a cold leg pipe which discharges into the core. Boron in the boric acid solution furnishes the desired degree of negative reactivity to prevent or turn around reactor power excursions. To preclude leakage to or from the boric acid tank when not in use, an equalizer line connected across the tank eliminates any pressure drops thereacross.

7 Claims, 5 Drawing Figures

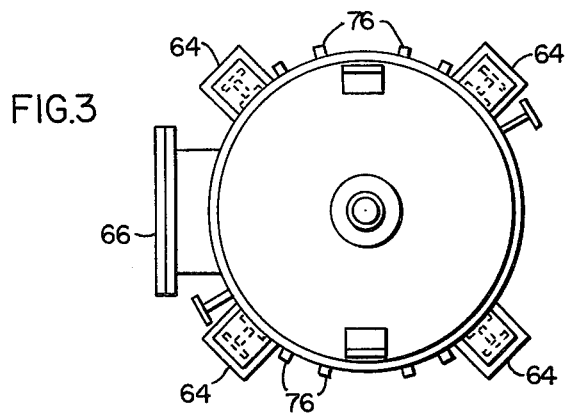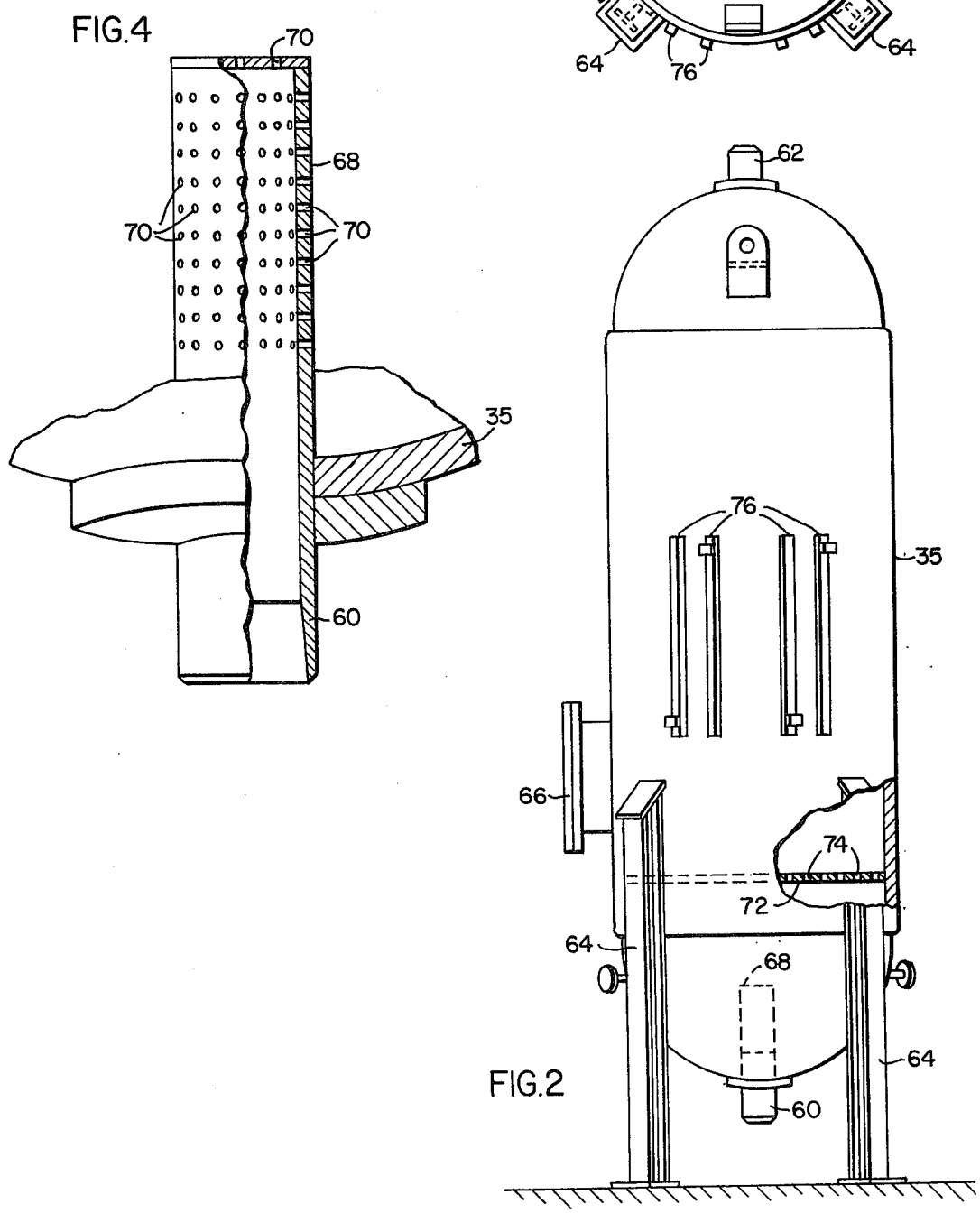

PROTECTION SYSTEM FOR A NUCLEAR REACTOR

BACKGROUND OF THE INVENTION

1. Field of the Invention

The invention described herein relates to nuclear reactors and more particularly to a protection system for preventing reactor power excursions when conditions arise causing rapid cooldown of the reactor coolant.

In nuclear reactor power plants of conventional design, a primary coolant is circulated by pumps through the reactor and an external steam generator in a closed loop. The steam generator comprises a heat exchanger having elements therein which transfer heat from the reactor coolant to a liquid circulated in a separate and distinct secondary loop. The secondary loop includes the steam generator, a turbine, condenser and a pump, the arrangement being such that as the reactor coolant is circulated through the steam generator and therefore in heat exchange relationship with the liquid in the secondary loop, heat is transferred to the secondary liquid which forms steam under high pressure for powering the turbine.

During operation of the reactor, it is essential that no significant amount of power be generated in the reactor following a large break in either the primary or secondary loops or under other abnormal circumstances where the primary coolant undergoes a rapid temperature change which requires the injection of a neutron absorber into the reactor. To illustrate, should a break occur in the secondary loop steam lines, temperature and flow sensing elements in the primary loop actuate components which cause the reactor control rods to automatically be inserted in the reactor core to stop the fission process. Simultaneously, the reactor coolant temperature then promptly commences dropping to a lower level because a greater amount of heat is transferred to the secondary liquid in the steam generator. However, to assure that a power excursion will not take place in the reactor, even though control rod insertion has taken place, it is desirable that additional negative reactivity be introduced into the reactor core. In the past, a tank containing a chemical neutron absorber in the form of concentrated boric acid was connected to the inlet of high-head safety injection pumps. Upon initiation of a signal which indicates abnormal reactor performance, the pumps then operated to promptly inject boric acid into the reactor core to thereby preclude or reverse power excursions in the reactor.

An important disadvantage resulting from the use of this type system is that the delay time between start-up of the pumps and boric acid injection is sufficiently great that under some circumstances, the reactor might continue to generate heat and prompt, complete, reactor shutdown would not be achieved. This type of injection system further requires sophisticated control equipment of a complex nature for setting the system into operation which not only complicates the process of introducing boric acid into the core, but also adds to the reactor plant costs. Also, high pressure pumps are required to inject the boric acid into the reactor.

Another disadvantage results from the need to completely isolate the boric acid tanks from the main reactor coolant system when the tanks are in a standby condition. Should a leak occur in the valves isolating the boric acid tanks, it is possible that as a pressure drop develops across the tank, the boric acid could slowly be diverted into the primary coolant loop and the existence of boric acid therein would then adversely affect reactor performance.

BRIEF SUMMARY OF THE INVENTION

Briefly stated, in carrying out the invention, the above disadvantages are eliminated by locating the neutron absorber tanks in a position close to the reactor, the arrangement being such that primary coolant is pumped into the neutron absorber tank to force the liquid neutron absorber therein directly into the reactor, thus minimizing the delay time between actuation of the pumps and the actual introduction of neutron absorber into the coolant circulater through the reactor. To held assure non-seepage of neutron absorber into the reactor primary coolant, pressure across the neutron absorber tank is equalized thereby effectively isolating the tank from all other system components.

An object of the invention therefore is to provide a simple and relatively inexpensive system for injecting a neutron absorber liquid into a reactor core with a minimum delay in time after system start-up.

Another object of the invention is to provide an arrangement for preventing leakage of liquids of different chemistry or concentration into or out of the neutron absorber tank.

Still another object of the invention is to provide a system for introducing a neutron absorber liquid into a reactor core by utilizing at least one reactor coolant pump for pumping purposes.

BRIEF DESCRIPTION OF THE DRAWING

While the specification concludes with claims pointing out and distinctly claiming the subject matter of the invention, it is believed the invention will be better understood from the following description taken in conjunction with the accompanying drawing, wherein:

FIG. 2 is a view in elevation, partly in section, illustrating the design of a neutron absorber tank;

FIG. 3 is a plan view of the tank of FIG. 2;

FIG. 4 is an enlarged view of a nozzle located in the bottom of the tank; and

Figure 1:
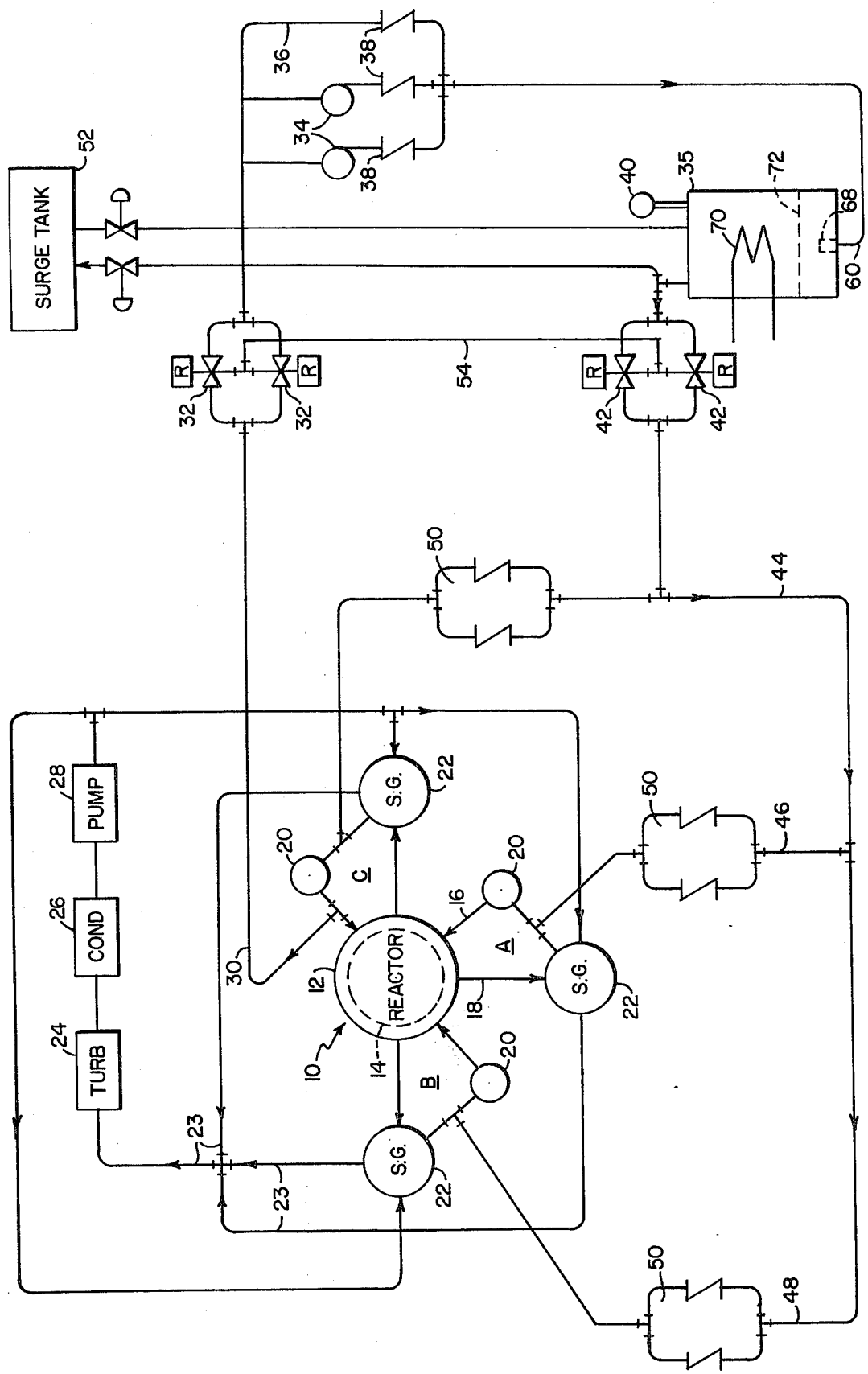
FIG. 1 is a diagrammatic view of a steam break protection system illustrating the disposition of a neutron absorber tank and pumps with respect to a nuclear reactor.

Referring now to the drawings wherein like reference characters designate like or corresponding parts throughout the several views, there is shown in FIG. 1, a nuclear reactor 10 comprising a reactor vessel 12 having a conventional reactor core 14 therein for generating heat. Three separate and identical loops A, B and C each having a coolant inlet 16, an outlet 18 and a pump 20 circulates coolant from the reactor to a steam generator 22 located in each loop. To utilize the heat thus imparted to the coolant in each loop, each steam generator 22 serves the function of a heat exchanger and transfers heat from the reactor coolant to a secondary liquid in a loop which includes steam supply lines 23, a turbine 24, condenser 26 and feed pump 28 connected to the steam generators. The temperature of coolant circulated through each reactor-steam generator loop, normally is about 600°F and is returned to the reactor at about 559°F while the temperature of liquid in the secondary loop leaves the steam generator at approximately 500°F. In the usual construction, the turbine is coupled to an electric generator which furnishes power to an electrical system.

Since the invention described herein becomes effective to turn around or prevent reactor power excursions when an abnormal operating condition arises which causes rapid cooldown of the reactor coolant, or other conditions requiring rapid injection of neutron absorber into the reactor coolant system, the invention will be described in relation to a steam break in the secondary coolant loop of a nuclear reactor. It will be understood however that the invention is applicable to all types of conditions causing power excursions in the reactor.

Upon the occasion of a break in at least one steam supply line 23 interconnecting the steam generators and turbine in the secondary loop, appropriate temperature and/or pressure sensitive and flow devices act to move control rods into the reactor core to essentially stop the fission process. Nevertheless, because of the negative temperature coefficient in the core, it can return to power even after control rod insertion. The liquid in the steam generator-turbine loop drops to about say 300°F as liquid flows out of the broken line to the atmosphere. As a result, a greater amount of heat is transferred to the coolant in the steam generator-turbine loop and coolant in the primary loop therefore flows into the reactor at a temperature substantially less than the normal 550°F. The effect then in the reactor is that the greater density of coolant resulting from the reduction in temperature, permits accelerated neutron activity and consequent generation of heat, which takes the form of power excursions deemed detrimental to reactor performance.

According to this invention, to minimize or completely eliminate such power excursions, a protection system is provided which is separate and distinct from the reactor primary coolant loop or the steam generator-turbine secondary loop. This system is connected to the reactor primary coolant loop to introduce a chemical neutron absorber material therein under conditions, for example, of a major steam break in the steam generator-turbine loop. As shown in FIG. 1, a line 30 is connected to the discharge side of pump 20 in one loop for supplying primary coolant to a pair of parallel connected valves 32 having their outlets connected to a pair of boron injection tank pumps 34. Pumps 34 may be omitted from the system if desired. A bypass line 36 assures delivery to boron injection tank 35 in the event pumps 34 do not operate. Check valves 38 preclude reverse flow from tank 35 into the reactor cooling system. The pumps 34 discharge into the boron injection tank 35 which contains a chemical neutron absorber.

The neutron absorber liquid in the tank may comprise boric acid, potassium pentaborate, or the like, which is effective in creating negative reactivity in the core when the absorber material is introduced thereinto. In the example chosen to illustrate the invention, the neutron absorber liquid comprises a 12% boric acid-water solution, which is maintained at a minimum temperature of 160°F to prevent boron from precipitating out of the solution at lower temperature levels. Indicator 40 shows the boric acid level therein.

As reactor primary coolant pump 20 in loop C applies coolant under pressure to the bottom of boron injection tank 35, boric acid or other neutron absorber is discharged from the tank through a pair of parallel connected motor operated valves 42 into lines 44, 46 and 48 leading to the other two loops A and B in the reactor. Each of these loops also contains parallel connected valves 50 for preventing backflow into the system.

It will be noted in this modification that the boron injection tank pumps 34 may alone, when operating, draw a suction on reactor coolant in one of the primary loops and force the neutron absorber solution in tank 35 into each of the other two primary loops of the reactor. Alternatively, a pump 20 in one of the loops may serve as the force for pumping coolant from one reactor loop through line 36, into the boron injection tank 35 for forcing the boric acid solution into the other two loops in the reactor.

In those installations where boron injection pumps 34 are used, it sometimes is desirable to locate them on the opposite side of boron tank 35 from that shown. In this case, the pumps 34 then draw a suction on tank 35 and discharge directly into one or a number of the primary loops.

As in conventional designs, a boric acid surge tank 52 is connected across tank 35 for maintaining the tank full and ready for use. It is essential that the boric acid contained in tank 35 not leak or otherwise seep into the reactor primary coolant loop since the boric acid serves as a neutron absorber for the reactor. Should valves 32 and 38 on one side of tank 35 and valves 42 and 50 on the other side leak, it will be apparent that the pressure drop thus established across tank 35 would cause boric acid therein to gradually seep into the primary coolant loop. To overcome this possible disadvantage, a pressure equalizing bypass line 54 is connected across the tank in the manner shown so that pressure on opposite sides of the tank will equalize and flow through the tank therefore will not occur. Line 54 is appropriately small compared with the main flow line through tank 35, so that only a small amount of flow from pump 20 will bypass tank 35 when the system is placed in operation.

In operation, should a break occur in any of the steam supply lines 23 in the steam generator-turbine loop, appropriate temperature sensitive devices located in that system detects existence of the break and energizes appropriate control equipment and valve relays which open valves 32 and 38, 42 and 50. The detection and electrical systems which perform these functions are essentially the same as that currently used with steam break protection systems and therefore are not disclosed in detail in this application. As the valves open, direct communication is established between the boric acid tank 35 and the cold legs A and B of the reactor-steam generator primary loops. Reactor coolant pump 20, or pumps 34 if used, then pumps primary coolant from loop C into boric acid tank 35 to thereupon force boric acid from tank 35 into the piping system for direct discharge into the two remaining cold legs A and B connected to the reactor inlets. Leg C also may be used, if desired. The amount of boric acid in tank 35 is chosen to provide the desired amount of negative reactivity to the reactor to thereby assure complete shutdown of the reactor and thus stop the generation of heat therein.

The benefits derived from operation of the above described system results primarily from system simplicity and by using the reactor coolant pressure, a relatively small pressure differential is needed to inject the neutron absorber solution into the reactor. The valves of both sides of tank 35 simply open upon receipt of a safety injection signal from the temperature or flow sensitive devices located in the steam generator-turbine loops or temperature devices in the primary loop. No further control action or control equipment is necessary to achieve proper performance of the system.

An important advantage is gained from locating the boric acid tank relatively close to the reactor primary coolant loops. Its close proximity to the reactor assures maintaining to an absolute minimum, the delay time between initiation of operation of the valve motors or relays, and safety injection pumps 34 if used, and the actual injection of boric acid into the reactor. Holding such delay times to the absolute minimum helps assure to the maximum degree the non-initiation of power excursions in the reactor when shut-down conditions are set in motion.

In addition, leakage of liquid of different concentrations or chemistry into or out of the neutron absorber tank 35 is prevented by interconnecting a line between the tank isolation valves. By using this unique feature, the pressure differential across the tank when the valves leak is zero. It is important to note the use of a chemical neutron absorber tank in the discharge side of the pumps 20 and 34, as distinguished from the prior art design of connecting the tank to the inlet of the safety injection pumps, did not appear to be an attractive arrangement until the leakage (delta pressure) problem across the tank was eliminated by utilizing the pipe connection across the tank and isolation valves.

The boron injection tank is illustrated in FIGS. 2, 3 and 4. For the particular steam protection system disclosed, the tank 35 has an internal volume of 120 cubic feet and contains about 900 gallons of chemical neutron absorber liquid. The tank has an inlet 60, an outlet 62 and since it is designed for operation in a vertical position, a plurality of tank supports 64 are welded or otherwise fixed to the tank exterior surface. To gain access to the tank for cleaning or other purposes, an 18 inch manway 66 is welded to the tank walls. It will be apparent that if liquid under high pressure and velocity was discharged directly into the tank upon opening the isolation valves, it would flow directly through the tank to outlet 62 and thus force only a portion of the neutron absorber into the system. It therefore is essential that the incoming liquid be required to flow radially outward into the tank near the inlet and thereby provide a wall of liquid capable of moving all the neutron absorber material out of the tank. To accomplish this, the inlet is equipped with a nozzle 68, FIG. 4, which extends a short distance into the tank. It includes a multiplicity of holes or perforations 70 disposed around its cylindrical surface and in the nozzle end wall. By utilizing this kind of design, the liquid introduced into the tank is caused to flow through holes 70 outwardly into the bottom of the tank where it forms a wall effective in uniformly exerting force on the neutron absorber therein to move it toward outlet 62 and directly into the reactor primary coolant system. To help assure even better distribution, a perforated plate 72 may be welded to the tank walls immediately outward from the nozzle 68. This plate is likewise equipped with multiple holes or perforations 74 which serve to more thoroughly provide a wall of liquid which pushes or forces the neutron absorber material out of the tank. As indicated previously, when the neutron absorber comprises a boric acid solution, the tank must be maintained at a temperature sufficiently high to assure that the boron will not precipitate out of the solution. Electrical heaters 76 provided for this purpose are mounted on the tank inner walls and appropriate conductors (not shown) lead to an appropriate voltage source.

Figure 5:
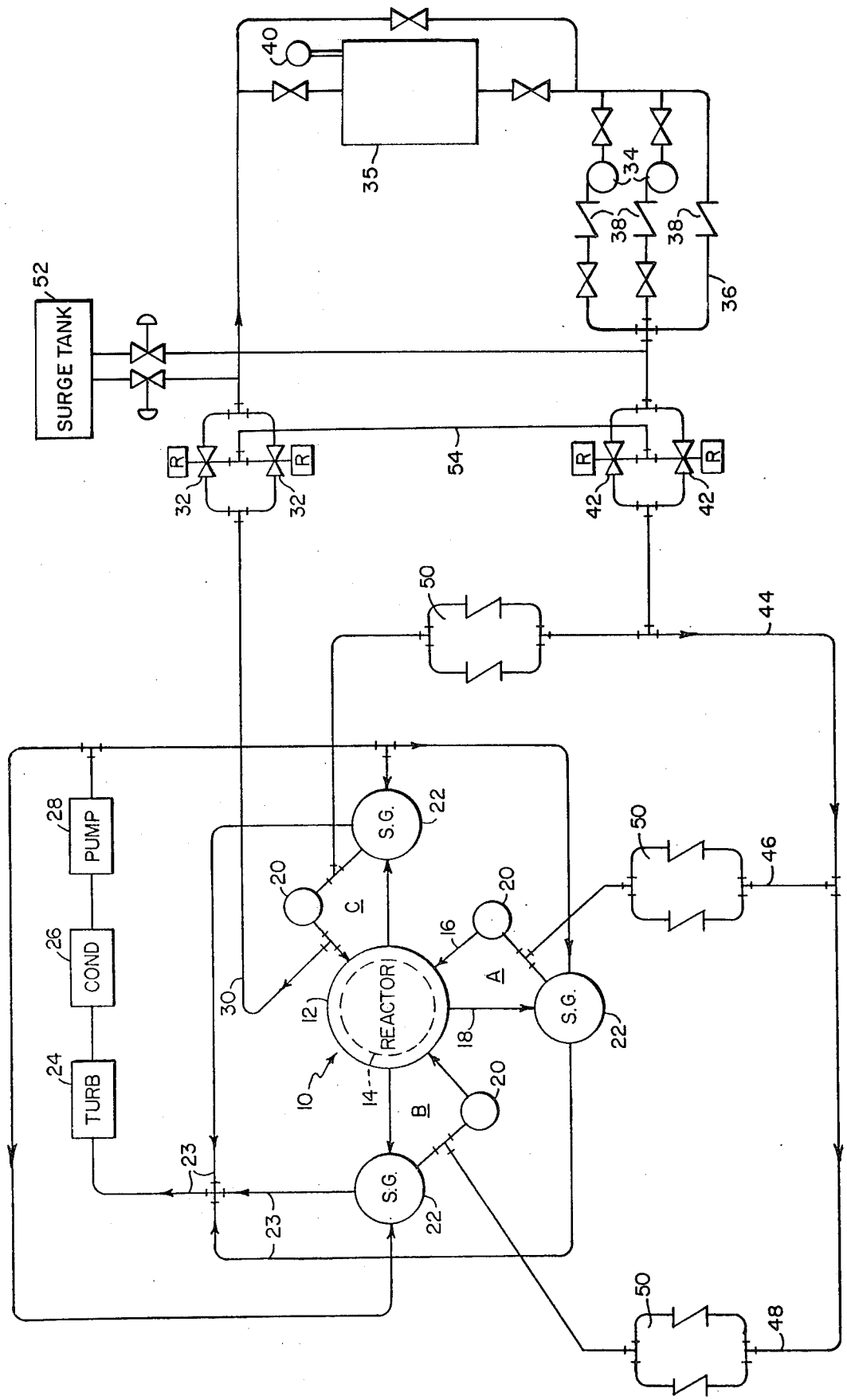
FIG. 5 is a modification of the system shown in FIG. 1.

The modification of the invention illustrated in FIG. 5 is similar to the FIG. 1 system except the pumps 34 are located on the discharge side of the boron injection tank 35 and therefore draw a suction on the tank 35 and discharge directly into one of the primary loops A or B, and C if desired.

Boron injection tank isolation valves 32 and 42 are located on opposite sides of tank 35 and pressure equalizing line 54 extends therebetween for accommodating any leakage from tank 35, all as described in relation to FIG. 1. It will be noted that in this modification, bypass line 36 and check valve 38 in parallel with pumps 34, permits primary coolant pump 20 to supply liquid from the reactor to boron injection tank 35. In the event pumps 34 are not operating, the neutron absorber forced from tank 35 by the reactor coolant, flows through the bypass 36 and directly into loops A and B for helping control reactor operation. If pumps 34 are operating, a suction is drawn on tank 35 and the neutron absorber therein is discharged directly into the primary loops.

It will be understood that to effect operation of the system, an emergency boration signal is received from pressure or temperature responsive elements conventionally located in the system, which effects the energization of devices designed to open valves 32 and 42 and start auxiliary pump motors 34, if desired.

In view of the above it will be apparent that many modifications and variations are possible in light of the above teachings. It therefore is to be understood that within the scope of the appended claims, the invention may be practiced other than as specifically described.

What is claimed is:

1. A reactor coolant cooldown protection system for a nuclear reactor power plant which includes a reactor vessel having multiple primary coolant loops, each loop containing piping connecting a pump and steam generator with the reactor vessel for circulating coolant from the reactor vessel through the steam generator, and a secondary loop for each of said primary loops, each secondary loop including piping connecting a secondary side of one of said steam generators with a turbine, condenser and a pump, said protection system comprising:

a tank having a neutron absorber therein located adjacent said reactor vessel;

means connecting the tank inlet to at least one of said primary coolant loops, and the outlet to at least one of the remaining primary loops;

isolation valves respectively connected on opposite sides of said tank for selectively isolating said tank; and equalizing means connected across said tank inlet and outlet for accommodating any pressure drop across said tank to thereby preclude the introduction of liquid of different chemistry into said tank or the discharge of neutron absorber therefrom into one of said loops in the event of valve leakage;

whereby as abnormal conditions arise requiring the injection of neutron absorber into the reactor vessel, the isolation valves are opened and primary coolant from the reactor is pumped by a primary coolant pump into the tank to force the neutron absorber therein directly into at least one of said remaining reator primary loops and thereby provide negative reactivity to said reactor.

2. The system according to claim 1 wherein a neutron absorber storage vessel is connected across said tank to maintain the tank in a full condition and accommodate neutron absorber volume changes; and heating means in said tank to maintain the neutron absorber therein at a predetermined temperature.

3. The system according to claim 1 wherein auxiliary pumps are connected between said primary coolant loop and the tank inlet and/or the tank outlet; and bypass means connected across said auxiliary pumps to assure delivery of said coolant to the neutron absorber tank in the event the auxiliary pumps are not used.

4. The system according to claim 1 wherein auxiliary pumps are connected between the outlet of said tank and at least one of said remaining primary loops.

5. The system according to claim 1 wherein said tank contains coolant distribution means located inwardly of said tank inlet for providing a wall of liquid in the tank which uniformly forces the neutron absorber therein through said outlet; and heater means on said tank for maintaining the neutron absorber at a predetermined temperature.

6. The system according to claim 5 wherein said coolant distribution means comprises a plate in said tank mounted inwardly of said inlet; and perforations in said plate which distribute coolant flowing from the inlet uniformly over the tank cross-section to provide a wall of liquid which forces the neutron absorber in said tank through said outlet.

7. The system according to claim 1 wherein said tank comprises a casing;

a nozzle mounted therein inwardly of the inlet;

said nozzle having radial and axial directed openings therein which cause coolant to flow from the inlet through said openings in radial and axial directions into said tank;

a plate mounted in said tank above said nozzle;

axial openings in said plate through which coolant from the nozzle flows to form a wall effective in forcing the neutron absorber in the tank through said outlet.

* * * * *